United States Patent
Dlugokecki

(10) Patent No.: US 9,481,272 B2
(45) Date of Patent: Nov. 1, 2016

(54) VEHICLE SEAT ASSEMBLY

(71) Applicant: LEAR CORPORATION, Southfield, MI (US)

(72) Inventor: Andrzej Dlugokecki, Troy, MI (US)

(73) Assignee: Lear Corporation, Southfield, MI (US)

( * ) Notice: Subject to any disclaimer, the term of this patent is extended or adjusted under 35 U.S.C. 154(b) by 74 days.

(21) Appl. No.: 14/518,541

(22) Filed: Oct. 20, 2014

(65) Prior Publication Data

US 2016/0107548 A1   Apr. 21, 2016

(51) Int. Cl.
*B60N 2/30* (2006.01)
*B60N 2/10* (2006.01)
*B60N 2/015* (2006.01)

(52) U.S. Cl.
CPC .......... *B60N 2/305* (2013.01); *B60N 2/01583* (2013.01); *B60N 2/10* (2013.01); *B60N 2/3011* (2013.01)

(58) Field of Classification Search
CPC ...... B60N 2/305; B60N 2/3011; B60N 2/10; B60N 2/01583
See application file for complete search history.

(56) References Cited

U.S. PATENT DOCUMENTS

| | | | |
|---|---|---|---|
| 5,482,345 A | 1/1996 | Bolsworth et al. | |
| 5,498,051 A * | 3/1996 | Sponsler | B60N 2/01583 248/503.1 |
| 5,634,686 A * | 6/1997 | Okazaki | B60N 2/01583 296/65.03 |
| 5,662,368 A * | 9/1997 | Ito | B60N 2/01583 248/503.1 |
| 5,984,397 A * | 11/1999 | Dawson | B60N 2/2222 296/65.09 |
| 6,000,742 A * | 12/1999 | Schaefer | B60N 2/3011 296/65.09 |
| 6,135,555 A | 10/2000 | Liu et al. | |
| 6,155,626 A * | 12/2000 | Chabanne | B60N 2/0155 248/503.1 |
| 6,164,712 A * | 12/2000 | Ajisaka | B60N 2/01583 296/65.03 |
| 6,227,619 B1 * | 5/2001 | Pesta | B60N 2/01583 296/65.03 |
| 6,361,098 B1 * | 3/2002 | Pesta | B60N 2/01583 248/503.1 |
| 6,460,929 B2 * | 10/2002 | Kamida | B60N 2/3006 296/65.11 |
| 6,520,581 B1 * | 2/2003 | Tame | B60N 2/206 296/65.01 |
| 6,669,261 B2 * | 12/2003 | Roberts | B60N 2/3043 296/65.01 |
| 6,793,285 B1 | 9/2004 | Tame | |
| 6,843,526 B2 * | 1/2005 | Honda | B60N 2/3011 296/65.03 |
| 7,954,873 B2 * | 6/2011 | Abe | B60N 2/3011 296/65.05 |
| 8,360,528 B2 * | 1/2013 | Shinohara | B60N 2/01583 296/65.09 |
| 8,708,392 B2 * | 4/2014 | Otsuka | B60N 2/3011 296/65.05 |
| 8,757,719 B2 * | 6/2014 | Hayakawa | B60N 2/065 297/331 |
| 2012/0043796 A1 * | 2/2012 | Kurachi | B60N 2/01583 297/337 |
| 2012/0139312 A1 * | 6/2012 | Kato | B60N 2/01583 297/330 |

FOREIGN PATENT DOCUMENTS

KR   20020075971 A   10/2002

\* cited by examiner

*Primary Examiner* — David R Dunn
*Assistant Examiner* — Tania Abraham
(74) *Attorney, Agent, or Firm* — Brooks Kushman P.C.

(57) ABSTRACT

A seat assembly having a latch assembly includes a seat cushion defining a transverse axis along a side-to-side direction of the seat cushion. The seat cushion is pivotally attached to the vehicle, and the latch assembly is attached to the seat cushion. The latch assembly includes a latch that has a latch position attaching the seat cushion to the vehicle at the latch assembly, and a release position releasing the seat cushion from the vehicle at the latch assembly. The latch assembly also includes a slider arrangement configured to facilitate pivotal movement of at least a portion of the latch assembly inboard toward a center line of the seat cushion and generally along the transverse axis. Such movement automatically occurs when the latch releases the seat cushion from the vehicle at the latch assembly and the seat assembly is pivoted forward about the riser.

20 Claims, 5 Drawing Sheets

VEHICLE SEAT ASSEMBLY

TECHNICAL FIELD

The present invention relates to a vehicle seat assembly having a latch assembly.

BACKGROUND

Vehicle seat assemblies are known to have a variety of different configurations, particularly for moving from a use position to a stowed position. In a stowed position, a vehicle seat assembly may allow for rotational or linear movement of a seat cushion, a seat back, or both. In order to maximize storage space, or space for ingress and egress, it may be desirable to have the seat assembly capable of arrangement in a compact configuration when it is in the stowed position. Therefore, it would be desirable to have a vehicle seat assembly having a latch assembly that was also capable of moving from a use position to a stowed position to further compact the stowed vehicle seat assembly.

SUMMARY

At least some embodiments of the present invention include a seat assembly for a vehicle having a seat cushion having a front-to-rear orientation defining a fore-aft axis, and a side-to-side orientation defining a transverse axis perpendicular to the fore-aft axis. A seat back is connected to the seat cushion, and a riser is attached to the seat cushion proximate a front of the seat cushion for pivotally attaching the seat cushion to the vehicle. A latch assembly is attached to the seat cushion proximate a rear of the seat cushion and includes a latch having a latch position that attaches the seat cushion to the vehicle at the latch assembly, and a release position that releases the seat cushion from the vehicle at the latch assembly. The latch assembly further includes a slider arrangement effecting a pivotal movement of at least a portion of the latch assembly inboard toward a center line of the seat cushion and generally in a direction along the transverse axis when the latch releases the seat cushion from the vehicle at the latch assembly and the seat assembly is pivoted forward about the riser.

At least some embodiments of the present invention include a seat assembly for a vehicle having a seat cushion having a front-to-rear orientation defining a fore-aft axis, and a side-to-side orientation defining a transverse axis perpendicular to the fore-aft axis. A seat bracket is attached to the vehicle and pivotally attached to the seat cushion. A latch assembly is attached to the seat cushion and includes a latch having a latch position attaching the seat cushion to the vehicle at the latch assembly, and a release position releasing the seat cushion from the vehicle at the latch assembly. The latch assembly is configured to automatically pivot at least a portion of the latch assembly generally in a direction along the transverse axis when the latch releases the seat cushion from the vehicle at the latch assembly and the seat assembly is pivoted about the bracket.

At least some embodiments of the present invention include a latch assembly for a vehicle seat having a front-to-rear orientation defining a fore-aft axis, and a side-to-side orientation defining a transverse axis perpendicular to the fore-aft axis. The latch assembly includes a slider arrangement including a base configured for attachment to the vehicle seat generally along the fore-aft axis. The latch assembly also includes a latch bracket that is pivotally attached to the base and has a slider guide. A slider element is attached to the base and linearly movable relative to the base. The slider element connects with the slider guide such that linear movement of the slider element relative to the base and generally along the fore-aft axis pivots the latch bracket in a direction generally along the transverse axis. A latch is connected to a portion of the slider arrangement and is configured to attach the latch assembly to the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
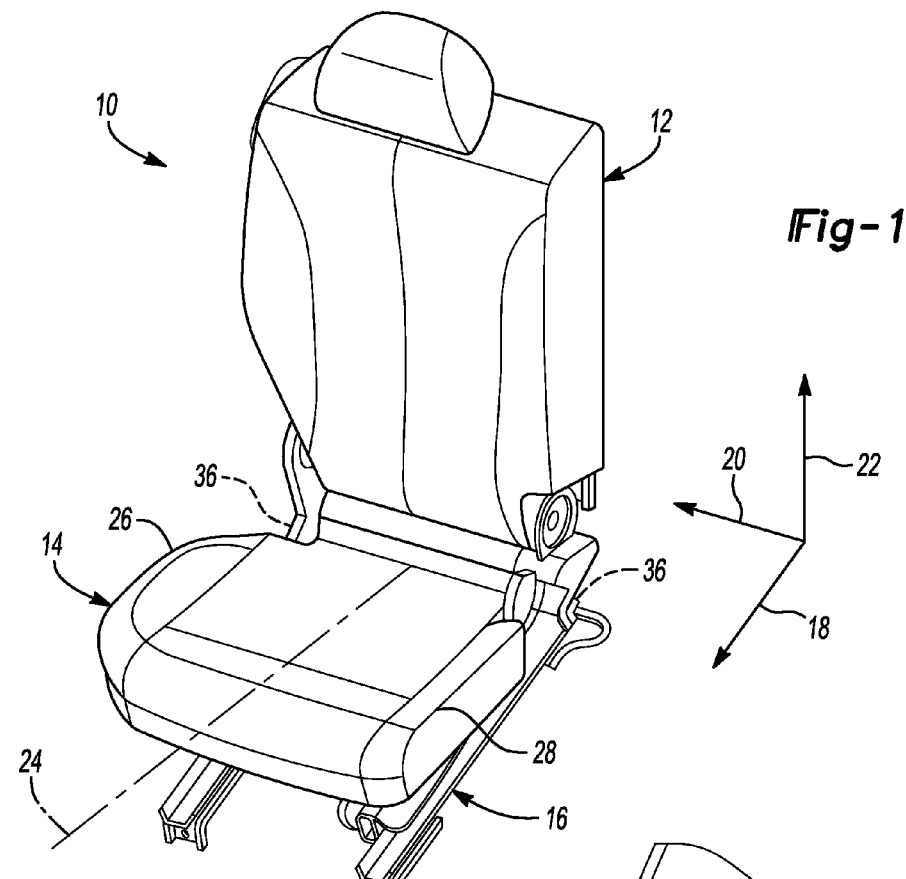
FIG. 1 shows a perspective view of the seat assembly in accordance with embodiments of the present invention.

FIG. 1 shows a seat assembly 10 in accordance with embodiments of the present invention. The seat assembly 10 includes a seat back 12 and a seat cushion 14. The seat back 12 and the seat cushion 14 may include any number of subcomponents, including an underlying support structure such as a frame, springs, padding and a cover material. To orient the seat assembly 10, three axes 18, 20, 22 are shown. Specifically, the seat cushion 14 has a front-to-rear orientation, which defines the fore-aft axis 18, and has a side-to-side orientation, which defines the transverse axis 20. The vertical axis 22 is shown to complete orientation of the three-dimensional space.

With regard to the fore-aft axis 18, it should be noted that although it is generally oriented front-to-rear relative to the seat cushion 14, the seat cushion 14 itself—including one or more of its components, such as a frame, padding, etc.—may be sloped relative to a horizontal reference line. Therefore, although the axis 18 may appear to be horizontal in FIG. 1, it does not necessarily need to be. Moreover, as explained in more detail below, the seat cushion 14 may be pivoted to a stowed position where it approaches or even reaches a vertical orientation. In such a case, the fore-aft axis 18 will pivot with the seat cushion 14, and may likewise approach or reach a vertical orientation, while still being generally oriented along a front-to-back direction of the seat cushion 14. Also shown in FIG. 1 is a center line 24 of the seat cushion 14, indicating an inboard position relative to the seat cushion 14, as compared to the outboard edges 26, 28 of the seat cushion 14.

Figure 2:
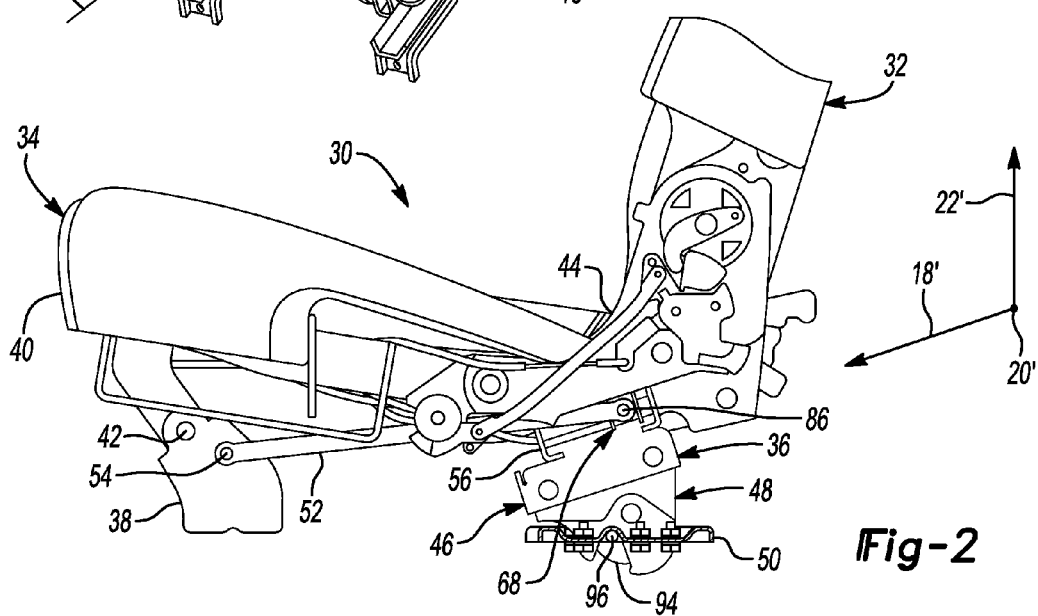
FIG. 2 shows a side view of a portion of the seat assembly in accordance with embodiments of the present invention.

FIG. 2 shows a portion of a seat assembly 30 having a slightly different track and mounting structure from the seat assembly 10. The seat assembly 30 includes a seat back 32 and a seat cushion 34. Also shown in FIG. 2 is a latch assembly 36 in accordance with embodiments of the present invention. The latch assembly 36 is also a part of the seat assembly 10, although it is not visible in FIG. 1. Specifically, the seat assembly 10 and the seat assembly 30 each have two of the latch assemblies 36, which in these embodiments are disposed rearward and relatively outboard toward the edges of their respective seat cushions 14, 34.

Also shown in FIG. 2 are axes 18', 20', 22', which are labeled with the prime (') symbol to indicate their correspondence with the axes 18, 20, 22 shown in FIG. 1. In FIG. 2, the transverse axis 20' is directed into the page, and therefore appears as a point. In accordance with the discussion above, the fore-aft axis 18' has a front-to-back orientation relative to the seat cushion 34, although it is not horizontal. In this embodiment, the fore-aft axis 18' is generally aligned with a portion of the latch assembly 36. This frame of reference facilitates a description of the components and working of the latch assembly 36 described below.

The seat assembly 30 includes a seat bracket or riser 38, which is disposed proximate a front portion 40 of the seat cushion 34. The riser 38 is attached to a portion of a vehicle, such as a vehicle floor (not shown) and is pivotally attached to the seat cushion 34 at a first pivot point 42. Although the seat bracket 38 is shown proximate a front 40 of the seat cushion 34, and the latch assembly 36 is disposed proximate a rear 44 of the seat cushion 34, in other embodiments, the positions may be reversed. The latch assembly 36 includes a slider arrangement 46 and a latch 48, which is shown in FIG. 2 in a latch position attached to another seat bracket 50. Also shown in FIG. 2 is an elongate member in the form of a connecting rod 52, which, as explained in more detail below, is pivotally attached to both the slider arrangement 46 and the riser 38, where it is connected at a second pivot point 54. The first and second pivot points 42, 54 are eccentrically disposed relative to each other, which, as explained in more detail below, helps to facilitate movement of the latch assembly 36 from a use position, such as shown in FIG. 2, to a stowed position.

Figure 3:
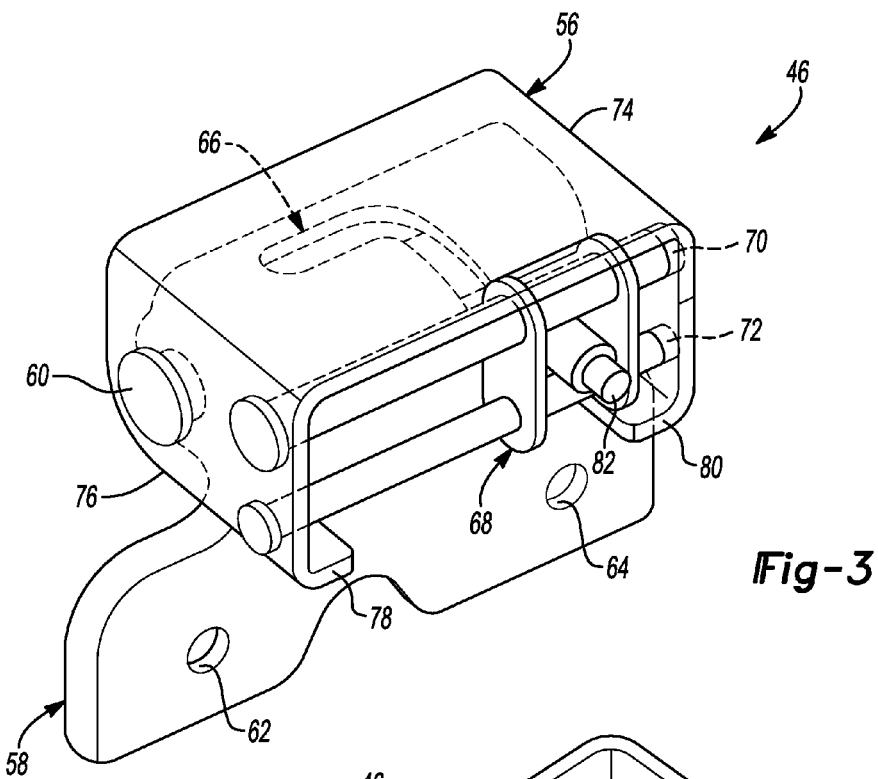
FIG. 3 shows a slider arrangement for use with a seat assembly in accordance with embodiments of the present invention.

FIG. 3 shows a perspective view of the slider arrangement 46, which includes a base 56 attachable to a seat cushion, generally with a front-to-back orientation—see, e.g., FIG. 2, where the base 56 is attached to the seat cushion 34 generally along the fore-aft axis 18'. The slider arrangement 46 also includes a latch bracket 58 pivotally attached to the base 56 via a pin 60. The latch 48 is configured for attachment to the latch bracket 58 with fasteners disposed through two apertures 62, 64, which effects coextensive pivotal movement of the latch 48 and the latch bracket 58—i.e., they pivot together. The latch bracket 58 further includes an aperture 66, partially hidden in FIG. 3, which provides a slider guide for a slider element 68.

The slider element 68 is attached to the base via two pins 70, 72, which allow the slider element 68 to move linearly relative to the base 56. As shown in FIG. 3, the slider element 68 is in a first position proximate one end 74 of the base 56, which also includes another end 76 disposed opposite the first end 74. As explained in more detail below, the slider element 68 cooperates with the slider guide 66 in the latch bracket 58 to orient the latch bracket 58 with a first orientation, which is shown in FIG. 3. The first orientation of the latch bracket 58 corresponds to a use position of a latch, such as the latch 48 shown in FIG. 2, where the latch is fastened to a seat bracket, such as the seat bracket 50. The base 56 also includes a pair of latch stops 78, 80, which are configured to contact and help properly orient the latch bracket 58 when the latch bracket 58 is in the first orientation as shown in FIG. 3.

Figure 4:
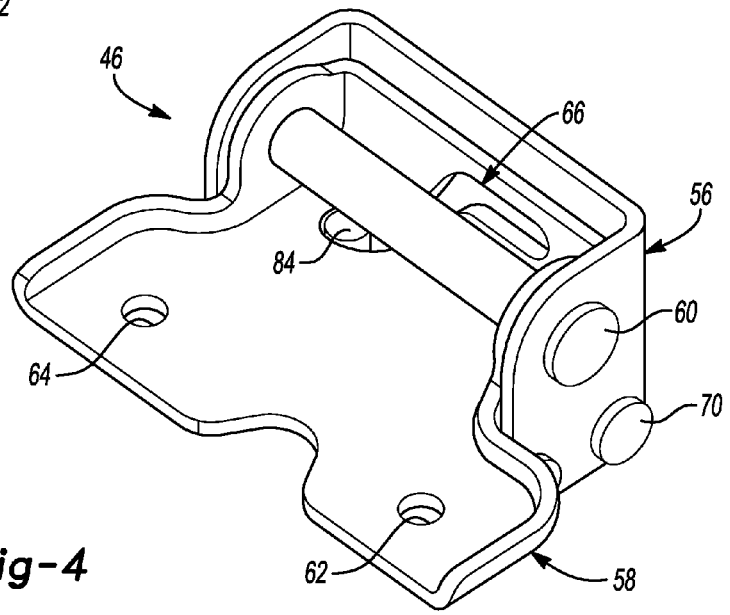
FIG. 4 shows a different view of the slider arrangement shown in FIG. 3.

The slider element 68 also includes a plurality of arbors extending outwardly therefrom. A first of the arbors 82 is shown in FIG. 3, while a second of the arbors 84 is shown in FIG. 4. The first arbor 82 is configured to be disposed within an aperture 86 of the connecting rod 52 to create a pivotal attachment—see FIG. 2. As shown in FIG. 3, the second arbor 84 is disposed within the aperture 66 in the latch bracket 58, and because of the shape of the aperture 66, which is in the form of a slider guide, the cooperation of the second arbor 84 and the slider guide 66 transforms linear movement of the slider element 68 relative to the base 56 into pivotal movement of the latch bracket 58.

Figure 5:
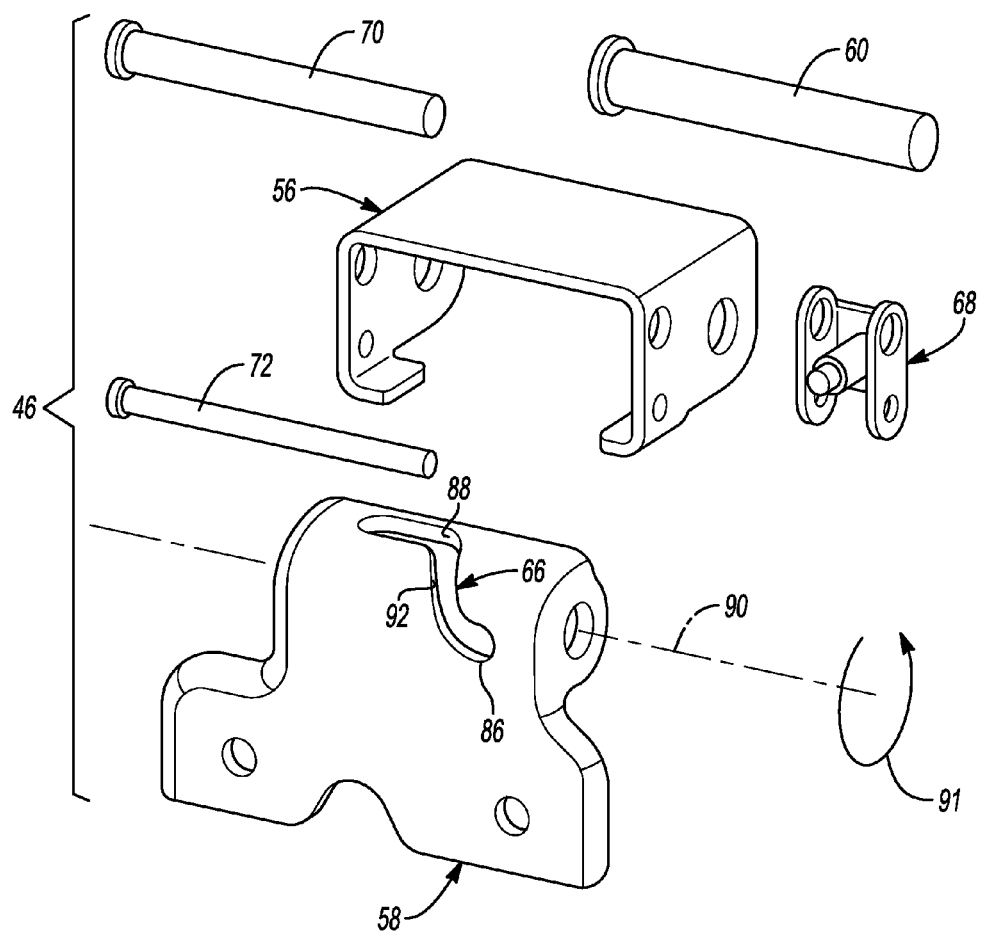
FIG. 5 shows an exploded view of the components making up the slider arrangement shown in FIGS. 3 and 4.

FIG. 5 shows an exploded view of the slider arrangement 46. As illustrated in FIG. 5, the slider guide 66 has first and second portions 86, 88, which are generally parallel to a longitudinal axis 90 of the latch bracket 58. A third portion 92 of the slider guide 66 forms a transition between the first and second portions 86, 88, and effects pivotal movement of the latch bracket 58 as the second arbor 84 of the slider element 68 moves linearly relative to the base 56 parallel to the axis 90. Specifically, as the slider element 68 moves from its first position shown in FIG. 3, where the arbor 84 is disposed in the first portion 86 of the slider guide 66, to a second position proximate the second end 76 of the base 56, where the arbor 84 is disposed in the second portion 88 of the slider guide 66, the latch bracket 58 rotates around the axis 90 in the direction of rotation arrow 91 as shown in FIG. 5.

Figure 7:
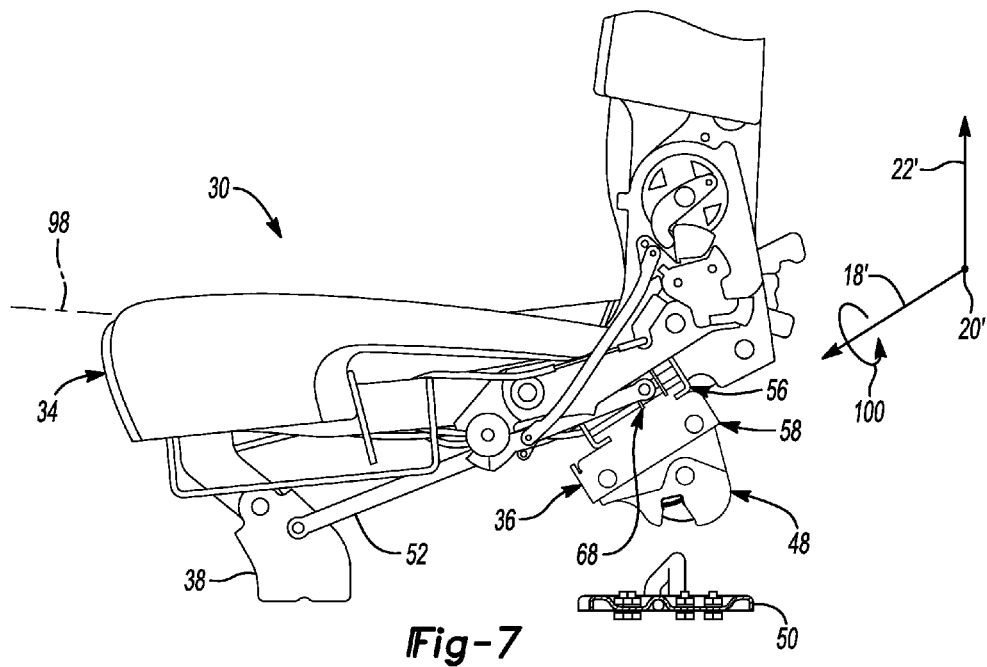
FIG. 7 shows the seat assembly from FIG. 6 as it begins to pivot around a front seat bracket and as the latch assembly begins to pivot inboard toward a center line of the seat assembly.
Figure 8:
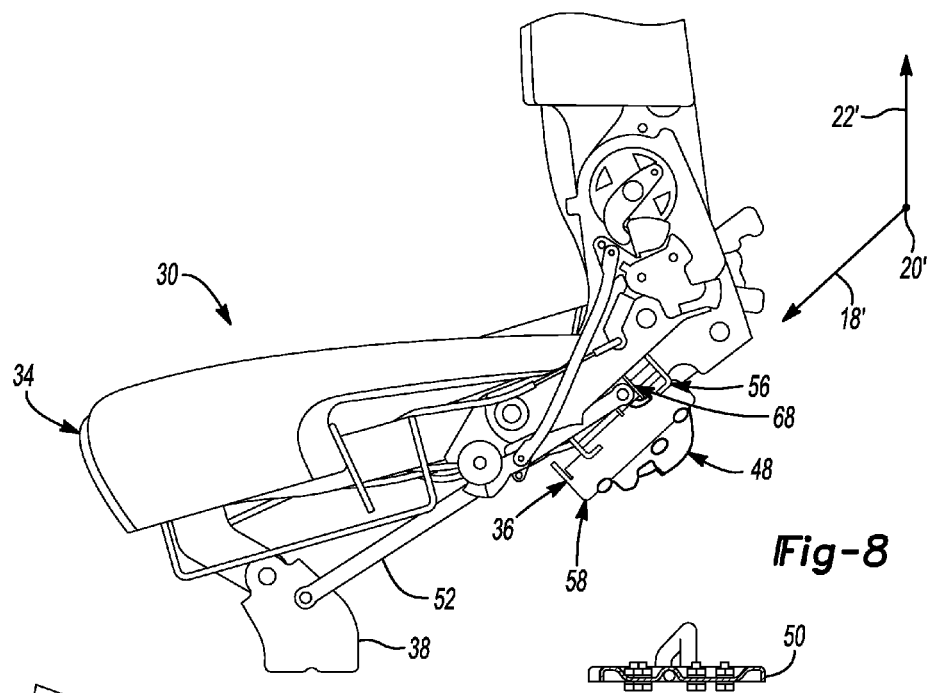
FIG. 8 shows the seat assembly as it continues to be pivoted forward around the front seat bracket, and the latch assembly as it continues to pivot inward.
Figure 9:
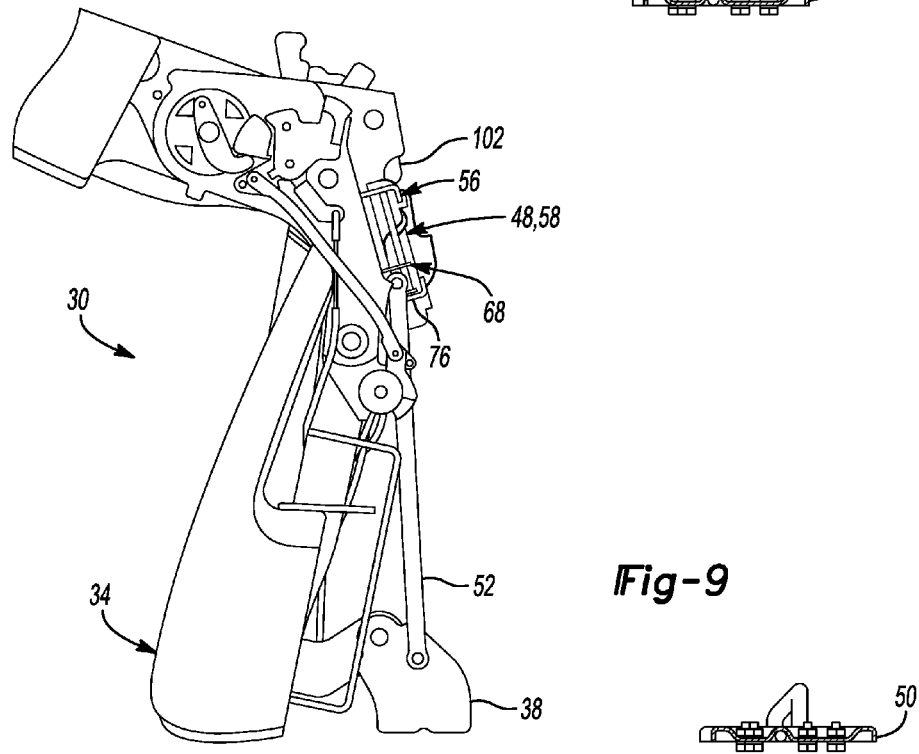
FIG. 9 shows the seat assembly and latch assembly in the stowed position.

FIGS. 6-9 show the seat assembly 30 as it transitions from its use position as shown in FIG. 2 to its fully stowed position as shown in FIG. 9. During this transition, it is also illustrated how the latch assembly 36 itself transitions from the use position as shown in FIG. 2 to its fully stowed position as shown in FIG. 9. In FIG. 2, the latch 48 is in the latch position, wherein the seat assembly 30, and in particular the seat cushion 34, is attached to the vehicle at the seat bracket 50. Specifically, a hook 94 of the latch 48 captures a striker 96, which in this embodiment is a pin, to secure the rear portion 44 of the seat cushion 34 to the vehicle floor. With the latch assembly 36 in the use position as shown in FIG. 2, the slider element 68 is in its first position proximate a first end of the base 56—see also FIG. 3.

Figure 6:
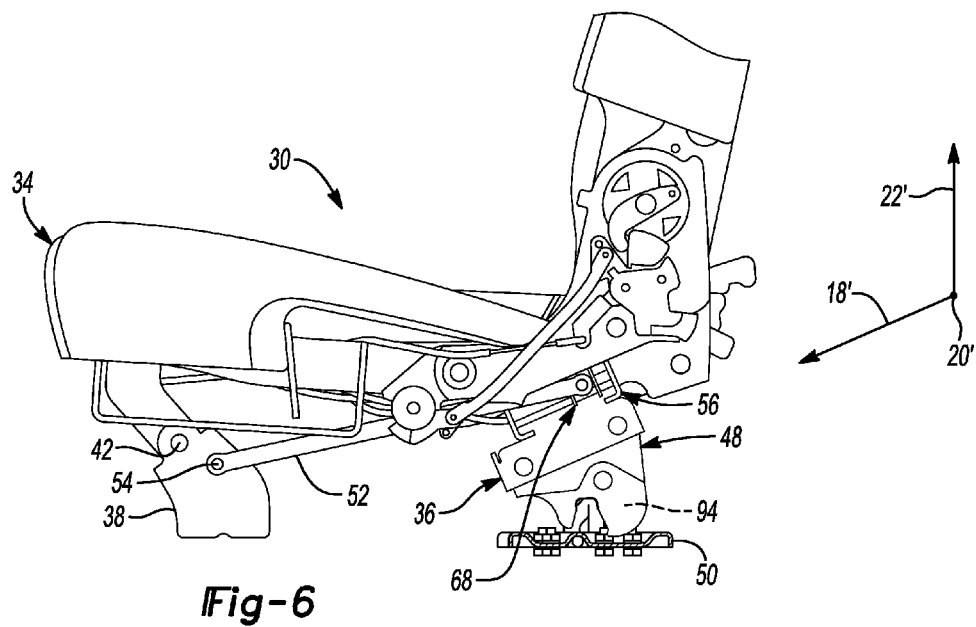
FIG. 6 shows the seat assembly from FIG. 2 with a latch assembly in a release position.

The latch 48 is shown in FIG. 6 in a release position, wherein the hook 94 is retracted into a housing of the latch 48, the seat cushion 34 is detached from the vehicle at the latch assembly, and the seat assembly 30 can now be pivoted forward about the first pivot point 42. As shown in FIG. 6, the seat assembly 30 has just begun to pivot about the riser 38 in a counterclockwise direction as viewed in FIG. 6, and the slider element 68 has started to move linearly relative to the base 56 and generally along the fore-aft axis 18'. In this embodiment, movement of the slider element 68 along the base 56 is a function of the connecting rod 52 having a different center of rotation—i.e., the second pivot point

54—from the center of rotation of the seat assembly 30 around the riser 38—i.e., the first pivot point 42. In other embodiments, different arrangements may be used instead of a connecting rod to effect movement of a slider element, such as the slider element 68. In FIG. 7, the seat assembly 30 is further rotated about the riser 38, and the slider element 68 is moved farther along the base 56 generally along the fore-aft axis 18'.

Also shown in FIG. 7 is a center line 98 of the seat cushion 34, which is centered relative to a side-to-side orientation of the seat cushion 34—see also FIG. 1 showing the center line 24 of the seat cushion 14. In FIG. 7, it can be observed that the latch assembly 36 is beginning to undergo a pivotal movement inboard toward the center line 98 and generally along the transverse axis 20; this is illustrated by the rotation arrow 100. At least a portion of the latch assembly 36 is configured to automatically pivot in this manner as the seat assembly 30 is rotated forward. Specifically, the latch 48 and latch bracket 58 rotate generally around the fore-aft axis 18' a direction along the transverse axis 20', while the base 56 remains fixed to the seat cushion 34, and the slider element 68 moves linearly relative to the fixed base 56.

FIG. 8 shows the seat assembly 30 in a further state of pivoting toward its stowed position. As shown in FIG. 8, the latch assembly 36 is further rotated along the fore-aft axis 18' in a direction along the transverse axis 20'. The connecting rod 52 continues to effect a linear movement of the slider element 68 relative to the base 56, which moves the second arbor 84—see also FIG. 4—through the slider guide 66, which causes the rotation of the latch bracket 58, and the latch 48 connected to it. Finally, the seat assembly 30 is shown in its fully stowed position in FIG. 9. In this position, the latch assembly 36 is also in its stowed position, pivoted inboard relative to the seat cushion 34 from the orientation shown in FIG. 2. As shown in FIG. 9, the slider element 68 is in a second position proximate the end 76 of the base 56. In this position, the slider element 68, and in particular the second arbor 84, cooperate with the slider guide 66 to orient the latch bracket 58 with a second orientation, which is generally perpendicular to the first orientation shown FIG. 3. In this way, the latch assembly 36 is conveniently stowed generally parallel to a bottom surface 102 of the seat cushion 34.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly for a vehicle, comprising:
   a seat cushion having a front-to-rear orientation defining a fore-aft axis, and a side-to-side orientation defining a transverse axis perpendicular to the fore-aft axis;
   a seat back connected to the seat cushion;
   a riser attached to the seat cushion proximate a front of the seat cushion for pivotally attaching the seat cushion to the vehicle; and
   a latch assembly attached to the seat cushion proximate a rear of the seat cushion and including a latch having a latch position that attaches the seat cushion to the vehicle at the latch assembly, and a release position that releases the seat cushion from the vehicle at the latch assembly, the latch assembly further including a slider arrangement effecting a pivotal movement of at least a portion of the latch assembly inboard toward a center line of the seat cushion and generally in a direction along the transverse axis when the latch releases the seat cushion from the vehicle at the latch assembly and the seat assembly is pivoted forward about the riser.

2. The seat assembly of claim 1, wherein the slider arrangement includes a base attached to the seat cushion generally along the fore-aft axis, a latch bracket pivotally attached to the base and having a slider guide, and a slider element attached to the base and linearly movable relative to the base, and
   wherein the at least a portion of the latch assembly includes the latch bracket, and the slider element connects with the slider guide such that linear movement of the slider element along the base pivots the latch bracket inboard toward the center line of the seat cushion.

3. The seat assembly of claim 2, wherein the latch is separate from the latch bracket and is connected thereto such that pivotal movement of the latch and latch bracket occurs together.

4. The seat assembly of claim 2, further comprising a connecting rod disposed between the slider element and the riser such that the slider element is moved linearly along the base when the seat assembly is pivoted forward about the riser.

5. The seat assembly of claim 4, wherein the riser attaches the seat cushion to the vehicle at a first pivot point, and the connecting rod attaches to the riser at a second pivot point different from the first pivot point.

6. The seat assembly of claim 4, wherein the slider element includes a plurality of arbors extending outwardly therefrom, a first of the arbors being disposed within an aperture in the connecting rod to create a pivotal attachment, and a second of the arbors being disposed within an aperture in the latch bracket.

7. The seat assembly of claim 6, wherein the aperture in the latch bracket provides the slider guide configured to cooperate with the second arbor to transform linear movement of the slider element relative to the base into pivotal movement of the latch bracket.

8. A seat assembly for a vehicle, comprising:
   a seat cushion having a front-to-rear orientation defining a fore-aft axis, and a side-to-side orientation defining a transverse axis perpendicular to the fore-aft axis;
   a seat bracket attached to the vehicle and pivotally attached to the seat cushion; and
   a latch assembly attached to the seat cushion and including a latch having a latch position attaching the seat cushion to the vehicle at the latch assembly, and a release position releasing the seat cushion from the vehicle at the latch assembly, the latch assembly being configured to automatically pivot at least a portion of the latch assembly generally in a direction along the transverse axis when the latch releases the seat cushion from the vehicle at the latch assembly and the seat assembly is pivoted about the bracket generally in a direction along the fore-aft axis.

9. The seat assembly of claim 8, wherein the latch assembly further includes a slider arrangement having a base attached to the seat cushion generally along the fore-aft axis, a latch bracket pivotally attached to the base and having a slider guide, and a slider element attached to the base and linearly movable relative to the base, the slider element being further attached to the slider guide such that linear movement of the slider element along the base pivots the latch bracket inboard toward a center line of the seat cushion.

10. The seat assembly of claim 9, further comprising an elongate member disposed between the slider element and the seat bracket such that the slider element is moved linearly along the base when the seat assembly is pivoted forward about the seat bracket.

11. The seat assembly of claim 10, wherein the elongate member is pivotally attached to the seat bracket eccentrically from the pivotal attachment of the seat cushion to the seat bracket.

12. The seat assembly of claim 10, wherein the slider element includes a first arbor disposed within an aperture in the elongate member to create a pivotal attachment, and a second arbor disposed within an aperture in the latch bracket.

13. The seat assembly of claim 12, wherein the aperture in the latch bracket provides the slider guide configured to cooperate with the second arbor to transform linear movement of the slider element relative to the base into pivotal movement of the latch bracket.

14. The seat assembly of claim 9, wherein the latch is separate from the latch bracket and is connected thereto such that coextensive pivotal movement of the latch and latch bracket occurs.

15. A latch assembly for a vehicle seat having a seat cushion with a front-to-rear orientation defining a fore-aft axis, and a side-to-side orientation defining a transverse axis perpendicular to the fore-aft axis, the latch assembly comprising:
   a slider arrangement including a base configured for attachment to the vehicle seat generally along the fore-aft axis, a latch bracket pivotally attached to the base and having a slider guide, and a slider element attached to the base and linearly movable relative to the base, the slider element connecting with the slider guide such that linear movement of the slider element relative to the base and generally along the fore-aft axis effects pivoting of the latch bracket in a direction generally along the transverse axis; and
   a latch connected to a portion of the slider arrangement and configured to attach the latch assembly to the vehicle.

16. The latch assembly of claim 15, further comprising a connecting rod configured for pivotal attachment at one end to the slider element and pivotal attachment at another end to a seat bracket mounting the vehicle seat to the vehicle.

17. The latch assembly of claim 16, wherein the slider element includes a first arbor disposed within an aperture in the connecting rod to create the pivotal attachment, the slider element further including a second arbor disposed within an aperture in the latch bracket.

18. The latch assembly of claim 17, wherein the aperture in the latch bracket provides the slider guide configured to cooperate with the second arbor to transform linear movement of the slider element relative to the base into pivotal movement of the latch bracket.

19. The latch assembly of claim 18, wherein the slider element has a first position proximate one end of the base wherein the slider element and the slider guide cooperate to orient the latch bracket with a first orientation, and a second position proximate another end of the base wherein the slider element and the slider guide cooperate to orient the latch bracket with a second orientation generally perpendicular to the first orientation.

20. The latch assembly of claim 19, wherein the base includes a latch stop contacting the latch bracket when the latch bracket is in the first orientation.

* * * * *